Feb. 11, 1969 F. W. FORK 3,426,802
METAL RACEWAY SECTION
Filed March 24, 1967 Sheet 1 of 2

INVENTOR.
FRANK W. FORK
BY George E. Manias
AGENT

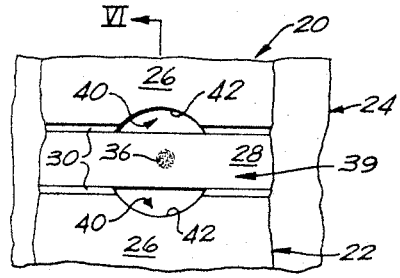
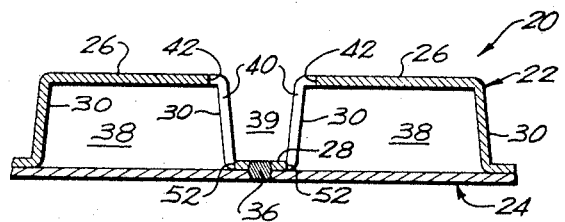
Fig. 5
Fig. 6
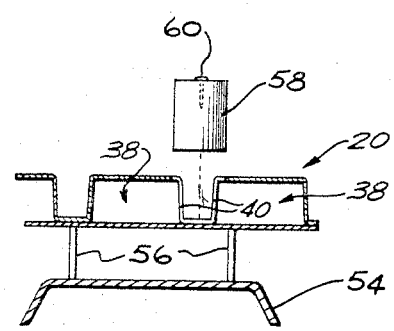
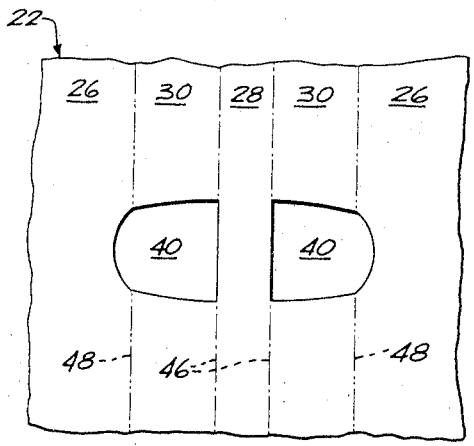
Fig. 8
Fig. 7
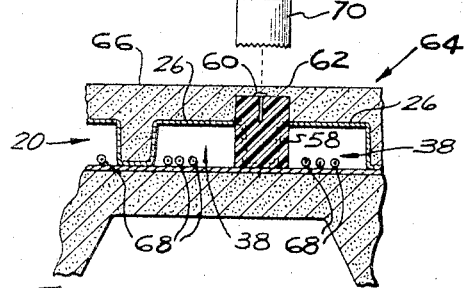
Fig. 9
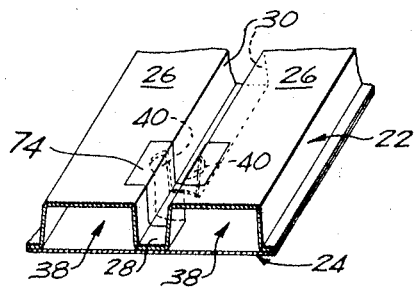
Fig. 11
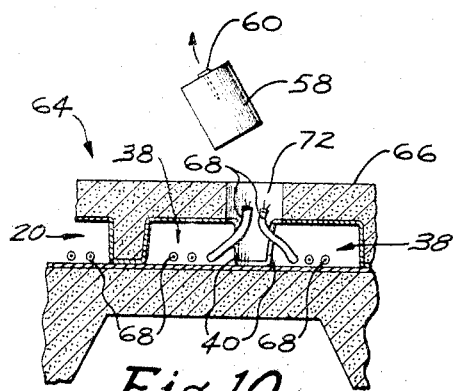
Fig. 10
INVENTOR.
FRANK W. FORK
BY
George E. Manias
AGENT United States Patent Office 3,426,802
Patented Feb. 11, 1969

3,426,802
METAL RACEWAY SECTION
Frank W. Fork, Allison Park, Pa., assignor to H. H. Robertson Company, Pittsburgh, Pa., a corporation of Pennsylvania
Continuation-in-part of application Ser. No. 587,509, Oct. 18, 1966. This application Mar. 24, 1967, Ser. No. 625,755
U.S. Cl. 138—92                    7 Claims
Int. Cl. E04b 5/48; E04f 17/08, 19/08

ABSTRACT OF THE DISCLOSURE

A metal raceway section of the type embedded in a concrete floor construction to provide plural enclosed cells and serve in electrical wiring distributing systems. The enclosed cells remain active as passageways for electrical wiring which may be installed prior to or after the completion of the floor construction. Pairs of factory installed opposed openings are formed at certain locations in the raceway section, each pair of openings permitting relatively easy access through the concrete and simultaneously to the interiors of selected adjacent cells at one location in the raceway section.

REFERENCE TO RELATED APPLICATION

This is a continuation-in-part of my co-pending application Ser. No. 587,509, filed Oct. 18, 1966 and entitled Metal Cellular Flooring Section and Method of Making Same.

BACKGROUND OF THE INVENTION

Field of the invention

This invention relates to metal raceway sections of the type adapted to be embedded in concrete and serve as an integral part of an electrical wiring distributing system, and more particularly to an improved metal raceway section of the type described, having prepunched openings therein which provide relatively easy and simultaneous access to the interiors of selected adjacent cells of the raceway section.

Description of the prior art

Metal raceway sections are well known in the art. These sections normally comprise a corrugated upper metal sheet which is secured to a lower metal sheet. The upper and lower metal sheets cooperate to form a plurality of spaced, generally parallel enclosed cells. The cells are most conveniently employed as raceways through which pass electrical wiring.

The metal raceway sections have been employed in building construction to provide versatility in electrical service. For example, concrete floor constructions having one or more metal raceway sections embedded therein are provided with a plurality of enclosed cells or raceways. These raceways remain available throughout the life of the building. Electrical wiring may be withdrawn from the raceways for connection to various electrical loads or electrical wiring may be introduced into the raceways to expand the electrical services beyond the existing capacity.

Heretofore, access to the interiors of the raceways beneath the concrete has been accomplished by penetrating the concrete and the sheet metal crest of a particular cell to introduce or withdraw electrical cables. Many electrical codes have required that the power conductors be maintained in a separate cell apart from the low voltage signal, communications, telephone wiring. Hence, it has been necessary to provide an individual floor outlet for power utilization and a separate floor outlet for telephone installations. Signal equipment has demanded a third floor outlet.

In my earlier filed co-pending application Ser. No. 535,282, filed Feb. 14, 1966 which is assigned to the assignee of the present invention, I have described a novel electrical distribution system wherein a single access opening is provided between a pair of underfloor cells to allow a single floor outlet to accommodate two types of service which are required by electrical codes to be delivered separately to the point of access.

SUMMARY OF THE INVENTION

The principal object of the present invention is to provide a metal raceway section having factory installed openings in the side walls of the electrical cells to accommodate availability of two types of electrical service at a single access location.

Another object of this invention is to provide readily removable closure means for the openings provided with the present raceway section.

The present invention provides improvements in a metal raceway section of the type described and wherein each pair of adjacent cells presents spaced crests, confronting generally vertical side walls and an intermediate valley disposed between the confronting side walls.

In accordance with the present invention, pairs of opposed openings are provided in the corrugated metal sheet at a plurality of locations thereon. Specifically, one of the opposed openings is formed in each of the confronting side walls such that each of the openings has an upper peripheral edge portion residing substantially at the level of the crest and a lower peripheral edge portion residing substantially at the level of the intermediate valley. The opposed openings provide communication between the interiors of the adjacent cells and the space above the intermediate valley.

In accordance with the present method of making the metal cellular sections, the opposed openings may be formed by piercing a single opening in the upper metal sheet before it is corrugated. The opposed openings are placed in those regions of the upper metal sheet which will subsequently comprise the confronting generally vertical side walls and the intermediate valley. Alternatively, the opposed openings may be formed by piercing two separate and spaced-apart openings in the upper metal sheet prior to its being corrugated in those regions of the upper metal sheet which will subsequently comprise the confronting generally vertical side walls.

Further in accordance with the present invention, readily removable closure elements are provided for temporarily closing the opposed openings to prevent concrete poured over the raceway section from entering the cells thereof. The closure elements permit easy entry into the adjacent cells after the concrete has hardened.

The above and other objects and advantages of the present invention will become apparent from the following detailed description by reference to the accompanying drawings, in which:

FIGURE 5 is a fragmentary plan view similar to

Figure 2:
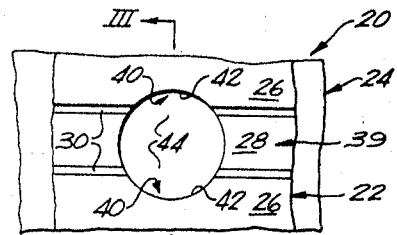
FIGURE 2 is a fragmentary plan view of a portion of the raceway section of FIGURE 1, illustrating opposed openings provided in adjacent cells thereof.
Figure 3:
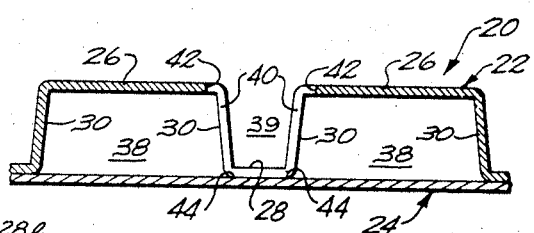
FIGURE 3 is a cross-sectional view taken along the line III—III of FIGURE 2.

FIGURE 2, illustrating an alternative embodiment of the present metal raceway section;

FIGURE 6 is a cross-sectional view taken along the line VI—VI of FIGURE 5;

FIGURE 7 is a fragmentary plan view of a metal sheet having a pair of spaced-apart openings pierced therein and which will subsequently be corrugated to form the upper sheet of the present metal raceway section;

FIGURE 8 is a fragmentary cross-sectional view, similar to FIGURE 3, illustrating readily removable means for closing the opposed openings of the present metal raceway section;

FIGURES 9 and 10 are cross-sectional views through a typical concrete floor construction, illustrating successive steps employed in gaining access through the opposed openings into the adjacent cells; and FIGURE 11 is a fragmentary isometric view illustrating alternative readily removable means for closing the opposed openings.

Figure 1:
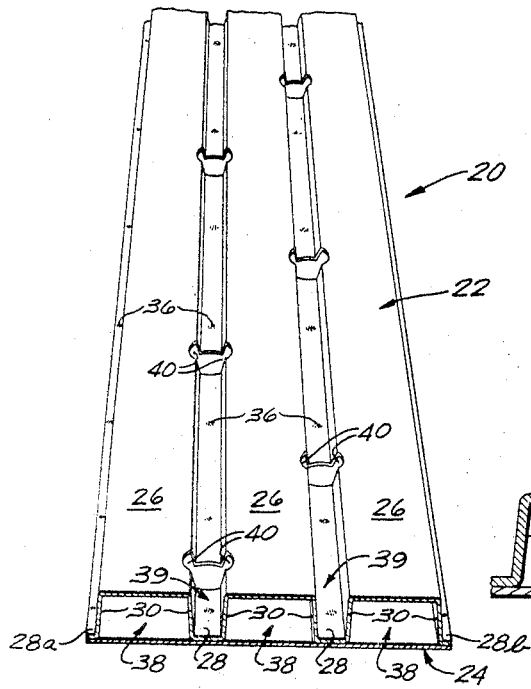
FIGURE 1 is an isometric view of a metal raceway section formed in accordance with the present invention.

Referring now to FIGURE 1, there is illustrated a metal raceway section 20 including an upper metal sheet 22 and a lower metal sheet 24.

The upper metal sheet 22 is corrugated and includes crests 26, valleys 28 and generally vertical side walls 30 which connect adjacent ones of the crests 26 and the valleys 28. The upper metal sheet 22 also includes side valleys 28a and 28b.

The lower metal sheet 24 has a flat rectangular configuration and is secured to the valleys 28 of the upper metal sheet 22 preferably by means of a plurality of spot welds 36. The lower metal sheet 24 cooperates with the crests 26 and the generally vertical side walls 30 to form a plurality of spaced, generally parallel enclosed cells 38.

It will be noted that each pair of adjacent cells 38 presents spaced crests 26, confronting side walls 30 and an intermediate valley 28; and that the confronting side walls 30 and the intermediate valley 28 define a trough-like space 39.

PRESENT IMPROVEMENT

Reference is now directed to FIGURES 1–3, inclusive. In accordance with the present invention, a pair of opposed openings 40 is provided at a plurality of locations along the length of the metal raceway section 20. The opposed openings 40 are formed in the side walls 30 of adjacent ones of the cells 38. The overall arrangement is such that the opposed openings 40 provide communication between two adjacent cells 38 and the intervening space 39 above the intermediate valley 28, as best shown in FIGURE 3. Each of the openings 40 may have an upper peripheral edge portion 42 residing substantially at the level of one of the crests 26 and a lower peripheral edge portion 44 residing substantially at the level of the intermediate valley 28. In this instance, the lower peripheral edge portion 44 is defined by the lower metal sheet 24.

Figure 4:
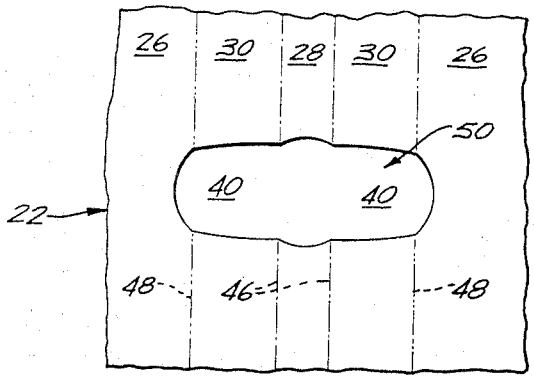
FIGURE 4 is a fragmentary plan view of a metal sheet having a single opening pierced therein and which will subsequently be corrugated to form the upper sheet of the present metal raceway section.

In FIGURE 4, a portion of the upper metal sheet 22 is illustrated prior to corrugation. Bend lines 46 and 48 are illustrated and define regions of the upper metal sheet 22 which will subsequently comprise the intermediate valley 28, the confronting generally vertical side walls 30, and the crests 26. The opposed openings 40 are preferably formed by piercing a single opening 50 in the sheet 22 prior to its being corrugated. The single opening 50 has a continuous edge extending through the crests 26, the side walls 30 and the intermediate valley 28. The configuration of the single opening 50 is such that when the upper sheet 22 is corrugated, the continuous edge resides substantially in the surface of a cylinder as shown in FIGURE 2. This cylindrical configuration is preferred since the opposed openings 40 are now adapted to receive a cylindrical base cup such as that base cup disclosed in my co-pending application Ser. No. 535,282, filed Feb. 14, 1966, which is assigned to the assignee of the present invention.

An alternative embodiment of the present metal raceway section 20 is illustrated in FIGURES 5, 6 and 7. Corresponding numerals will be employed to identify corresponding parts heretofore described.

Referring now to FIGURES 5 and 6, the metal raceway section 20 is provided with the opposed openings 40 each of which includes the upper edge portion 42 residing substantially at the level of the crests 26 and a lower edge portion 52 which, in this instance, comprises an edge of the intermediate valley 28.

In FIGURE 7, there is illustrated a portion of the upper metal sheet 22 prior to corrugation. The bend lines 46 and 48 are illustrated and define those regions of the upper metal sheet 22 which will subsequently comprise the crests 26, the intermediate valley 28 and the confronting side walls 30. In this embodiment, the opposed openings 40 are formed by piercing two separate and spaced-apart openings in those regions of the upper metal sheet 22 which will subsequently comprise the confronting side walls 30. The configuration of the edge of the openings 40 is such that when the upper metal sheet 22 is corrugated, the opening edges will reside substantially in the surface of a cylinder as shown in FIGURE 5.

In this embodiment, the valleys 28 remain intact throughout their length. Consequently, the upper metal sheet 22 may be secured to the lower metal sheet 24 by means of a spot weld 36 placed on the valley 28 anywhere along its length. The spot weld 36 may be placed between the opposed openings 40.

The opposed openings 40 have been described and illustrated as having a circular presentation when viewed in plan as in FIGURE 2. It is to be understood, however, that the opposed openings 40 could, instead, have any other desired presentation, such as a square and a diamond.

Referring now to FIGURE 8, a fragment of a metal raceway section is shown supported horizontally above a conventional concrete form 54 preparatory to pouring concrete. Support elements schematically illustrated at 56 temporarily secure the raceway section 20 to the concrete form 54 and maintain the raceway section 20 in a horizontal orientation. Prior to pouring the concrete, it is necessary to close the opposed openings 40 to prevent ingress of the concrete into the cells 38.

In accordance with the present invention, the means for closing the opposed openings 40 preferably comprises a plug 58 which, in this instance, has a cylindrical configuration. A magnetically susceptible element 60, such as a nail, may be positioned at the center of the plug 58 to assist in locating the plug 58 after the section 20 and plug 58 have been covered by concrete. Alternatively, the element 60 may comprise a magnet.

The plug 58 is inserted into the opposed openings 40 and, as shown in FIGURE 9, has an upper surface 62 disposed at or above the level of the crests 26. The plug 58 completely closes the opposed openings 40 and prevents ingress of concrete into the cells 38. The plug 58 may be formed from any suitable material which will resist being crushed by the concrete poured thereover. Examples of suitable materials include foamed plastics, such as foamed polystyrene, foamed polyurethane, foamed polyethylene; thin gauge metals, cardboard, lightweight concrete, foamed glass and the like.

In FIGURE 9 there is illustrated a floor construction 64 consisting of concrete 66 in which the metal raceway section 20 is embedded. The concrete forms 54 (FIGURE 8) have been removed. The floor construction 64 is illustrative of a typical floor in which the metal raceway section serves to distribute electrical wiring 68. Although embedded within the concrete 66, the cells 38 remain available throughout the life of the building. Access to the wiring 68 in the adjacent cell 38 may be readily accomplished as will now be described.

To gain access to the interiors of the cells 38, a hole is drilled through the concrete 66, for example, by means of a suitable hole saw 70 in a manner well known in the art. Positioning of the hole saw 70 directly over the plug 58 is facilitated by the element 60 in a manner also well known in the art. The plug 58 is then removed as shown in FIGURE 10 and an opening 72 remains which permits access to the interiors of the adjacent cells 38.

Referring now to FIGURE 11, the opposed openings 40 could, instead, be closed by securing a sheet material 74 across the opposed openings 40 and to the crests 26, the side walls 30 and the valley 28. Suitable materials to be used include various cloths, stiff papers, thin gauge metal, tapes, films and the like.

SUMMARY

From the foregoing detailed description, it should be readily apparent that the present invention provides an improved metal raceway section wherein access to the interiors of the several cells may be readily achieved. Furthermore, the present metal raceway section is provided with pre-punched openings arranged to provide communication between the interiors of adjacent cells and the space between the adjacent cells at one location in the raceway section. Access to the adjacent cells is easily attainable after the raceway sections have been embedded in a layer of hardened concrete. This arrangement is exceedingly advantageous in that two adjacent cells may be activated simultaneously by drilling one hole in the concrete rather than by drilling two holes as was heretofore required.

The present invention further provides readily removable closure elements which can be installed in the factory or in the field, as desired, to close the opposed openings. The closure elements prevent ingress of concrete into the cells and are readily removable when the cells of the raceway section are activated.

I claim as my invention:

1. In a metal raceway section adapted to be embedded in a concrete floor construction, said raceway section comprising a corrugated upper metal sheet having crests and valleys and generally vertical side walls connecting adjacent ones of said crests and said valleys, and a lower metal sheet secured to said corrugated sheet and cooperating with said crests and said side walls to form a plurality of spaced, generally parallel cells, each pair of adjacent cells presenting spaced crests, confronting side walls and an intermediate valley disposed between said confronting side walls, the improvement comprising:

the confronting side walls having at least two opposed openings, one formed in each of said confronting side walls, said opposed openings providing communication at one location in said raceway section, between the interiors of said adjacent cells and the space above said intermediate valley.

2. The improvement as defined in claim 1 wherein each of said opposed openings has an upper edge portion residing substantially at the level of a said crest and a lower edge portion residing substantially at the level of said intermediate valley.

3. The improvement as defined in claim 1 including readily removeble means for closing each of said openings.

4. The improvement as defined in claim 3 wherein said readily removable means comprises a plug inserted between said adjacent cells into said openings having an upper surface disposed at or above the level of said spaced crests.

5. The improvement as defined in claim 3 wherein said readily removable means comprises a sheet material applied over said openings and secured to the corrugated metal sheet.

6. The improvement as defined in claim 1 wherein said upper edge portion of each of said openings has an arcuate configuration and extends into one of said spaced crests.

7. The improvement as defined in claim 1 wherein said opposed openings are formed in said corrugated sheet by a single piercing operation such that a continuous edge is provided extending through the said spaced crests and the said confronting side walls of said adjacent cells and the said intermediate valley, said continuous edge residing substantially in the surface of a cylinder.

References Cited

UNITED STATES PATENTS

| 2,073,490 | 3/1937 | Lewin | 138—92 X |
| 3,303,264 | 2/1967 | Saul et al. | 52—221 X |
| 3,282,298 | 11/1966 | Hudson | 138—92 |

FOREIGN PATENTS 389,053    6/1965    Switzerland.

MERVIN STEIN, *Primary Examiner.*

U.S. Cl. X.R.

52—221; 174—49, 96; 138—103